US006440187B1

(12) United States Patent
Kasai et al.

(10) Patent No.: US 6,440,187 B1
(45) Date of Patent: Aug. 27, 2002

(54) ALUMINA POWDER, PROCESS FOR PRODUCING THE SAME AND POLISHING COMPOSITION

(75) Inventors: Toshio Kasai, Urawa; Kiyomi Ema, Funabashi; Isao Ota, Funabashi; Tohru Nishimura, Funabashi, all of (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/581,084

(22) PCT Filed: Jan. 5, 1999

(86) PCT No.: PCT/JP99/00009

§ 371 (c)(1),
(2), (4) Date: Jul. 18, 2000

(87) PCT Pub. No.: WO99/35089

PCT Pub. Date: Jul. 15, 1999

(30) Foreign Application Priority Data

Jan. 8, 1998 (JP) ............................................. 10-002082

(51) Int. Cl.[7] ............................ C09K 3/14; C09G 1/02
(52) U.S. Cl. ........................ 51/309; 106/3; 438/692; 438/693; 252/79.2; 501/127; 423/625; 423/629
(58) Field of Search ............................ 51/309; 106/3; 438/692, 693; 501/127; 423/625, 626, 629; 252/79.2

(56) References Cited

U.S. PATENT DOCUMENTS

| 4,705,566 A |   | 11/1987 | Senda et al. |         |
|-------------|---|---------|--------------|---------|
| 4,959,113 A | * | 9/1990  | Roberts      | 156/636 |
| 5,114,437 A | * | 5/1992  | Takeuchi et al. | 51/293 |
| 5,336,079 A | * | 8/1994  | Okazaki et al. | 428/323 |
| 5,858,813 A | * | 1/1999  | Scherber et al. | 438/693 |
| 5,989,515 A | * | 11/1999 | Watanabe et al. | 423/625 |

FOREIGN PATENT DOCUMENTS

| EP | 0 554 908 A1 |   | 8/1993  |
| JP | 45-3658      |   | 2/1970  |
| JP | 60-166220 A  |   | 8/1985  |
| JP | 2-23589 B2   |   | 5/1990  |
| JP | 2-158682 A   |   | 6/1990  |
| JP | 2283783      | * | 11/1990 |
| JP | 5-345611 A   |   | 12/1993 |
| JP | 6136147      | * | 5/1994  |
| JP | 7-89717 A    |   | 4/1995  |
| JP | 986924       | * | 3/1997  |

* cited by examiner

*Primary Examiner*—Michael Marcheschi
(74) *Attorney, Agent, or Firm*—Oliff & Berridge, PLC

(57) ABSTRACT

Production of an alumina powder characterized by having a single or multiple crystal structure selected from the group consisting of γ, δ and θ-forms, a primary particle size of 10 to 50 nm, a mean secondary particle size of 100 to 500 nm, and a granular primary particle shape, or an alumina powder characterized by having an a-form crystal structure, a primary particle size of 60 to 150 nm, a mean secondary particle size of 200 to 500 nm, and a granular primary particle shape, using as a raw material an alumina hydrate comprising rectangular plate-like primary particles having a boehmite structure and having a length of one side of 10 to 50 nm; and preparation of a polishing composition comprising the alumina powder, water and a polishing accelerator.

8 Claims, No Drawings

US 6,440,187 B1

ALUMINA POWDER, PROCESS FOR PRODUCING THE SAME AND POLISHING COMPOSITION

TECHNICAL FIELD

The present invention relates to an alumina powder characterized by having a single or multiple crystal structure selected from the group consisting γ, δ and θ-forms, a primary particle size of 10 to 50 nm, a mean secondary particle size (mean aggregated particle size) of 100 to 500 nm, and a granular primary particle:shape, an alumina powder characterized by having an α-form crystal'structure, a primary particle size of 60 to 150 nm, a mean secondary particle size (mean aggregated particle size) of 200 to 500 nm, and a granular primary particle 'shape, and processes for producing those. The present invention also relates to polishing compositions using those alumina powders as an abrasive.

The polishing compositions of the present invention can efficiently provide a smooth polished surface with high precision in polishing an aluminum disk, and therefore are useful as a final finish polishing composition. The "polishing an aluminum disk" intended herein means to polish the surface of a substrate itself of a magnetic memory disk comprising aluminum or its alloy, the surface of a layer of, for example, non-electrolysis nickel-phosphornus (Ni—P) plating or non-electrolysis nickel-boron (Ni—B) plating, formed on the substrate, particularly a hard layer of non-electrolysis nickel-phosphorus (Ni—P) plating having compositions comprising 90 to 92% Ni and 8 to 10% P, and the surface of an aluminum oxide layer.

Further, the polishing material using an abrasive of alumina according to the present invention can efficiently provide a smooth polished surface with high precision, and therefore is useful for polishing an oxide film, a nitride film or carbide film of a semiconductor device, a wiring metal of a semiconductor multilayer wiring substrate, or the like, and for final finish polishing a magnetic head, a quartz, a glass and the like.

PRIOR ART

Alumina powder comprising alumina fine particles having a mean particle size of 1 μm or less is produced by dry and/or wet grinding alumina having a crystal structure of, for example, γ, δ, κ, θ, η or α-form obtained by calcining aluminum hydroxide that is produced by the Bayer process at low cost and in large amount.[%F]urther, high purity alumina powder of a plate-like, γ-form, δ-form or the like crystal structure having a primary particle size of 20 to 80 nm or high purity alumina powder of α-form crystal structure having a primary particle size of 150 to 200 nm or more is commercially available.

Further, EP-A-0554908 (corresponding to JP-A-5-345611 (1993)) describes α-form alumina having a primary particle size of 20 to 50 nm in which a barrier of silica is formed around boehmite particles to thereby suppress growth of particles in transferring to α-form alumina.

Further, JP-A-7-089717 (1995) discloses a process for producing alumina sol of, for example, γ, δ, κ, θ, η or α-form, having a mean particle size of 100 nm or less by a peptization method of contacting commercially available ultrafine alumina powder as it is, or a powder obtained by calcining the ultrafine alumina powder, with a cation-exchange resin in an aqueous phase in the presence of an acid.

A slurry obtained by mixing water, an alumina polishing material, and a polishing accelerator, and if necessary, a surface modifier, is used as a polishing composition which is used in polishing an aluminum disk. As the examples of this polishing accelerator, U.S. Pat. No. 4,705,566 (corresponding to JP-B-2-023589 (1990)) disclosed aluminum nitrate, nickel nitrate, nickel sulfate, and the like, and JP-A-2-158682 (1990) discloses sodium nitrite, potassium nitrite, calcium nitrite, magnesium nitrite, barium nitrite, zinc nitrite, aluminum nitrite or the like.

Problems to be Solved

In recent years, performance of aluminum disk has the tendency of gaining higher density and higher speed. Therefore, no surface defect of orange peel, scratch, pit, asperity or the like, and high flatness with small mean surface roughness and small maximum surface roughness are strongly demanded.

The alumina powder having a crystal structure of, for example, γ, δ, κ, θ, η or α-form obtained by calcining and grinding aluminum hydroxide produced by the Bayer process has a broad particle size distribution due to the breakdown method even if the alumina powder comprises alumina fine particles having a mean particle size of 1 μm or less. For this reason, a wet classification (hydraulic elutriation or the like) is conducted, but it is difficult to completely remove coarse particles. Where a polishing material having coarse particles intermixed therein is used, it is difficult to obtain a polished surface of high quality.

Further, in the alumina powder having a crystal structure of γ or δ-form obtained by calcining aluminum hydroxide produced by a metal alkoxide method, the particle shape is plate-like. Therefore, the material to be polished is in the state that the material slides on a pad during polishing, and a removal rate is slow, so that productivity of polishing step is poor. Furthermore, since the alumina powder having a crystal structure of α-form has a primary particle size of 150 to 200 nm or more, it is difficult to obtain a polished surface of high quality.

Further, in the α-form alumina having a barrier of silica as the surface layer and having a primary particle size of 20 to 50 nm, the removal rate thereof is slow due to the silica layer having a removal rate slower than that of alumina.

On the other hand, alumina sol of, for example, γ, δ, κ, θ, η or α-form having a mean particle size of 100 nm or less by a peptization method of contacting commercially available ultrafine alumina powder as it is, or a powder obtained by calcining the ultrafine alumina powder, with a cation-exchange resin in an aqueous phase in the presence of an acid has a primary particle size of 10 nm or less. Therefore, the removal rate is slow and productivity of polishing step becomes poor.

SUMMARY OF THE INVENTION

The present invention has an object to provide alumina powders as an abrasive suitable for a polishing composition which can improve productivity of polishing step and decrease cost by increasing the removal rate while maintaining the polished surface of high quality, a process for producing those alumina powders, and a polishing composition.

The present inventors have found an alumina powder having a single or multiple crystal structure selected from the group consisting of γ, δ and θ-forms, a primary particle size of 10 to 50 nm, wherein the particle size distribution is sharp, a mean secondary particle size (mean aggregated particle size) of 100 to 500 nm, and a granular primary particle shape, obtained by calcining alumina hydrate comprising rectangular plate-like primary particle having a length of one side of 10 to 50 nm and having a boehmite structure as a raw material by the production process of the present invention without using commercially available alumina powder and grinding, and an alumina powder having an α-form crystal structure, a primary particle size of 60 to 150 nm in which the particle size distribution is sharp, a mean secondary particle size (mean aggregated particle size) of 200 to 500 nm, and a granular primary particle shape obtained by the same process and the same raw material. The present inventors have also found that if the alumina powder of the present invention is used as an abrasive in a polishing composition for aluminum disk, comprising an abrasive, water and a polishing accelerator, a polished surface of higher quality can be obtained as compared with the conventional polishing material for aluminum. disk, and the alumina powder has high speed polishing property.

In addition, the present inventors have found that if an alumina mixed abrasive is prepared by adding the alumina powder having a single or multiple alumina crystal structure selected from the group consisting of γ, δ and θ-forms, a primary particle size of 10 to 50 nm, a mean secondary particle size (mean aggregated particle size) of 100 to 500 nm, and a granular primary particle shape to the alumina powder having an α-form crystal structure, a primary particle size of 60 to 150 nm, a mean secondary particle size (mean aggregated particle size) of 200 to 500 nm, and a granular primary particle shape, or to an alumina powder having an α-form crystal structure, a primary particle size of 50 nm to 2 μm, and a mean secondary particle size of 200 nm to 3μm obtained by calcining and grinding the commercially available aluminum hydroxide produced by the Bayer process, and then mixing those, a polished surface of higher quality can be obtained by polishing, and a polishing material for aluminum disk having high speed polishing property can be formed on polishing A production process of the alumina powder that is characterized by having a single or multiple crystal structure selected from the group consisting of γ, δ and θ-forms, a primary particle size of 10 to 50 nm, a mean secondary particle size (mean aggregated particle size) of 100 to 500 nm, and a granular primary particle shape comprises the following steps (A), (B), (C) and (D):

(A) a step of adding an alkali to an aqueous alumina sol containing fibrous colloidal particles of amorphous alumina hydrate to form a reaction mixture having pH of 9 to 12;

(B) a step of subjecting the reaction product obtained in step (A) to hydrothermal treatment at 110 to 250° C. to form an aqueous suspension containing alumina hydrate having boehmite structure;

(C) a step of drying the aqueous suspension obtained in step (B) at 100° C. or more and then calcining the same at 500 to 1,130° C. to form alumina having a single or multiple crystal structure selected from the group consisting of γ, δ and θ-forms; and (D) a step of dry and/or wet$_1$grinding the alumina obtained in step (C).

The alumina powder having δ-form crystal structure, a primary particle size of 10 to 50 nm, a mean secondary particle size of 100 to 500 nm, and a granular primary particle shape, wherein the polishing property is more preferable, is obtained by calcining at 850 to 1,050w in step (C).

A production process of the alumina powder is characterized by having an α-form crystal structure, a primary particle size of 60 to 150 nm a mean secondary particle size of 200 to 500 nm, and a granular primary particle shape comprises the following steps,(A), (B), (C) and (D):

(A) a step of adding an alkali to an aqueous alumina sol containing fibrous colloidal particles of amorphous alumina hydrate to form a reaction mixture having pH of 9 to 12;

(B) a step of subjecting the reaction product obtained in step (A) to hydrothermal treatment at 110 to 250° C. to form an aqueous suspension containing an alumina hydrate having boehmite structure;

(C) a step of drying the aqueous suspension obtained in step (B) at 100° C. or more and then calcining the same at 1,150 to 1,300° C. to form alumina having an α-form crystal structure; and [0axb]p1(D) a step of dry and/or wet grinding the alumina obtained in step (C).

Considering productivity and polishing properties, it is preferable that alumina powder characterized by having an α-form crystal structure, a primary particle size of 60 to 150 nm, a mean secondary particle size of 200 to 500 nm, and a granular primary particle shape is calcined at 1,180 to 1,250° C. in step (C).

The polishing composition for aluminum disk comprises an abrasive of alumina, water and a polishing acceleratory. The abrasive of alumina comprises the alumina powder characterized by having a single or multiple crystal structure selected from the group consisting of γ, δ and θ-forms, a primary particle size of 10 to 50 nm, a mean secondary particle size of 100 to 500 nm, and a granular primary particle shape; the alumina powder characterized by having an α-form crystal structure, a primary particle size of 60 to 150 nm, a mean secondary particle size of 200to 500 nm, and a granular primary particle shape; or a mixture of the alumina powder having a single or multiple crystal structure selected from the group consisting of γ, δ and θ-forms, a primary particle size of 10 to 50 nm, a mean secondary particle size of 100 to 500 nm, and a granular primary particle shape, and the alumina powder having an α-form crystal structure, a primary particle size of 50 nm to 2 μm, a mean secondary particle size of 200 nm to 3 μm.

The polishing accelerator is preferably a basic salt formed from a trivalent or tetravalent metal and an inorganic or organic acid. As the trivalent or tetravalent metal, aluminum is more preferable. Of the inorganic acid or organic acid, nitric acid is more preferable in polishing property. Basic aluminum nitrate is more preferable. The further more preferable is basic aluminum nitrate represented by the chemical composition of $Al(OH)_x(NO_3)_{3-x}$ (wherein x is a real number of 0.5–2.7).

Embodiment Mode for Carrying Out the Invention

The production process of the alumina powder of the present invention is described in detail below.

In step (A), the aqueous alumina sol containing fibrous colloidal particles of amorphous alumina hydrate used in step (A) is easily obtained by the conventional production process, and is available as commercially available industrial chemicals. JP-B-45-003658 (1970) and JP-A-60-166220 (1985) disclose a process for producing an aqueous alumina sol containing fibrous colloidal particles of amorphous alumina hydrate by reacting an aqueous solution of an organic acid and a metallic aluminum powder under heating. The aqueous alumina sol obtained by those conventional production processes of aqueous alumina sol :can also be exemplified.

The aqueous alumina sol as the raw material is not limited so long as it does not form a gel, and sols comprising from ones having low viscosity of several mPa·s to ones having high viscosity of several hundreds of thousand mPa·s can be used. In particular, an aqueous alumina sol having $Al_2O_3$ concentration of 2 to 30 wt % and pH of 2 to 7 is preferable. Further, since formation of a bulk of gel material or rise in viscosity is induced depending on the addition method of an alkali, it is further preferable that the $Al_2O_3$ concentration of the aqueous alumina sol is previously adjusted to 2 to 4 wt % at the time of adding the alkali.

In a reaction mixture having pH of less than 9 obtained by adding an alkali, the objective acidic aqueous alumina sol containing alumina hydrate having boehmite structure cannot be obtained even if hydrothermal treatment of the next step is conducted. On the other hand, even in a reaction mixture having pH exceeding 12 obtained by adding excess alkali, the objective aqueous alumina suspension containing alumina hydrate having boehmite structure can be obtained. However, the excess alkali must be removed in step (B), which is not preferable. Therefore, it is more preferable for the reaction mixture obtained by adding an alkali to have pH of 9 to 12.

In step (B), if the reaction product is subjected to hydrothermal treatment at a temperature of less than 110° C. long time is required for the formation of a crystal structure of from fibrous colloidal particles of an amorphous alumina hydrate to rectangular plate-like primary particles of the alumina hydrate having a boehmite structure in an aqueous suspension, which is not preferable. On the other hand, in the hydrothermal treatment reaction exceeding 250° C., a quenching equipment, ultrahigh pressure vessel or the like is necessary as an additional apparatus, which is not preferable.

In order to decrease the contents of salts in the aqueous suspension, desalting treatment can be conducted by an ultrafiltration or an ion exchange method., In step (C), if calcined at a temperature of less than 500° C., the boehmite particles remain unchanged. Further, in the case of calcining at a temperature exceeding 1300° C. particle growth of particles having α-form crystal structure is vigorous, so that the primary particles become 150 to 200 nm or more, surface roughness is large, and orange peel, scratch, pit and asperity increase, which are not preferable.

In step (D), if dry and/or wet grinding is insufficient, the secondary particles are larger than 500 nm, so that surface roughness is large, :and orange peel, scratch, pit and asperity increase, which are not preferable.

The alumina powder according to the present invention, which has a single or multiple crystal structure selected from the group consisting of γ, δ and θ-forms, is an alumina powder having a primary particle size of 10 to 50 nm and a mean secondary particle size of 100 to 500 nm, obtained by dry and/or wet grinding such as vibration mill, ball mill, attritor or sand grinder. This alumina powder uses alumina hydrate having a boehmite structure of controlled particle size as a raw material, and therefore a particle size distribution is sharp.

The alumina powder having an; α-form crystal structure of the present invention is an alumina having a primary particle size of 60 to 150 nm and a mean secondary particle size of 200 to 500 nm, obtained by dry and/or wet grinding such as vibration mill, ball mill, attritor or sand grinder. This alumina powder uses alumina hydrate having a boehmite structure of controlled particle size as a raw material, and therefore a particle size distribution is sharp.

The primary particle size of alumina powder intended here is individual primary particle size measured by observing the primary particles with a transmission electron microscope, and is not a mean particle size.

The mean secondary particle size of alumina powder is a median particle size (50% volume particle size) showing a mean aggregated particle size. Commercially available centrifugal particle size distribution measuring apparatus, such as CAPA-700, manufactured by Horiba, Ltd., is used for the measurement thereof.

The polishing composition of the present invention is described in detail below.

The content of the abrasive of alumina in the polishing composition is 0.5 to 20 wt %. If the content of the abrasive of alumina is less than 0.5wt %, the polishing effect is small, and if the content is increased to exceed 20 wt %, further improvement in the polishing effect is not recognized.

In the alumina powder having a single or multiple crystal structure selected from the group consisting of γ, δ and θ-forms, a primary particle size of 10 to 50 nm, a mean secondary particle size of 100 to 500 nm, and a granular primary particle shape, the preferable crystal structure is δ-form crystal structure. ;

In the alumina powder mixture of the alumina powder having a single or multiple crystal structure selected from the group consisting of γ, δ and θ forms, a primary particle size of 10 to 50 nm, a mean secondary particle size of 100 to 500 nm, and a granular primary particle shape, and the alumina powder having an α-form Crystal structure, a primary particle size of 50 nm to 2 μm, a mean secondary particle size of 200 nm to 3 μm, the weight ratio of the alumina solid content (a) of a single or multiple crystal structure selected from the group consisting of γ, δ and θ-forms and the alumina solid content (b) of α-form crystal structure is preferably a:b=5:95 to 70:30, and more preferably 5:95 to 50:50. In the group consisting of γ-, δ- and θ-form alumina powders, δ-form alumina powder is preferable. If the δ-form alumina powder is used in the above alumina powder mixture, a ratio ((Vp/Ra) of a removal rate (Vp) to a mean surface roughness((Ra) as polishing characteristics becomes high, which is preferable.

Zirconia, zirconium silicate, silica, mullite, cerium oxide, iron oxide, chromium oxide, titanium oxide and the like which are oxides can be added together with the alumina powder. Hydroxides such as aluminum hydroxide, hydrated oxide such as boehmite; and non-oxides such as diamond, boron nitride, silicon nitride, silicon carbide or boron carbide can also be added.

The polishing accelerator is preferably a basic salt formed from a trivalent or tetravalent metal and an inorganic or organic acid. Examples of the trivalent metal include aluminum, indium and iron, and examples of the tetravalent metal include zirconium, cerium, tin and titanium. Examples of the inorganic acid include nitric acid and sulfuric acid, and examples of the organic acid include acetic acid, formic acid, sulfamate, tartaric acid, oxalic acid and gluconic acid. As the trivalent or tetravalent metal, aluminum is excellent. As the inorganic acid and organic acid, nitric acid is excellent in the polishing properties. Basic aluminum nitrate is more preferable. The further more preferred is basic aluminum nitrate represented by the chemical composition of $Al(OH)_x(NO_3)_{3-x}$ (wherein x is a real number of 0.5 to 2.7). The most preferable is $Al(OH)(NO_3)_2$.

The polishing accelerator content is preferably 0.1 to 10 wt % when expressed in a reduced concentration of metal oxide $M_2O_3$ (wherein M represents a trivalent metal: atom) in a basic salt formed from the trivalent metal and the inorganic acid or organic acid, and when expressed in a reduced concentration of metal oxide $MO_2$ (wherein M represents a tetravalent metal atom) in a basic salt formed from the tetravalent metal and the inorganic acid or organic acid. If the content is less than 0.1 wt %, the effect as the polishing material is not recognized, and if the content is increased to exceed 10 wt %, further improvement of the effect as the polishing accelerator is not recognized. The content is more preferably 0.3 to 6 wt %.

Further, water-soluble alcohols such as ethanol, propanol, ethylene glycol or propylene glycol; acids such as hydrochloric acid, sulfuric acid, nitric acid, acetic acid or phosphoric acid; surface active agents such as sodium alkylbenzenesulfonate or formalin condensate; organic polyanion type substances such as polyacrylate; and celluloses such as cellulose, hydroxyethyl cellulose or carboxymethyl cellulose, which are generally added to the polishing composition can also be added to the polishing composition.

The analytical methods employed in the present invention are as follows.

(1) pH Measurement

Measured using a pH meter (M-8AD, manufactured by Horiba, Ltd.).

(2) Electric Conductivity

Measured using a conductometer (CM-30S, manufactured by TOA Electronics Ltd.).

(3) Primary Particle Size and Primary Particle Shape

Primary particle size and primary particle shape were observed with a transmission electron microscope.

Observation method: A sample was diluted with pure water, and the sample was coated on a hydrophilic carbon-coated collodion film placed on a microscope sample grid of copper, and then dried to prepare a sample for observation. An electron micrograph of the sample for observation was taken with a transmission electron microscope (H-500, manufactured by Hitachi, Ltd.) to observe the sample.

(4) Mean Secondary Particle Size

Median particle size (50% volume size) was measured using a centrifugal sedimentation particle size measuring apparatus (CAPA-700, manufactured by Horiba, Ltd.) to determine a mean secondary particle size (mean aggregated particle size).

(5) Particle Size by Dynamic Light Scattering Method

Measured using an apparatus for measuring a particle size by dynamic light scattering method (Culter N4 (registered trademark), manufactured by Culter Electronics, Inc.).

(6) Specific Surface Area (BET Method)

A sample previously dried under the prescribed conditions was measured using a specific surface area meter of nitrogen gas absorption method (MONOSORB Model MS-16, manufactured by Quantachrome Corp.).

(7) Powder X-ray Analysis

Measured using an X-ray diffraction device (JEOL JDX-8200T, manufactured by JEOL Ltd.)

EXAMPLE

The present invention is further explained by the following examples.

(Preparation of polishing compound)

Example 1

1,767.0 g of water was added to 450.0 g of aqueous alumina sol (Alumina sol-200 (trademark), manufactured by Nissan Chemical Industries, Ltd., $Al_2O_3$ concentration: 10.7 wt %, acetic acid concentration: 3.2 wt %) containing fibrous colloidal particles of commercially available amorphous alumina hydrate. While strongly stirring the resulting mixture, 211.5 g of sodium hydroxide aqueous, solution having a NaOH concentration of 4.9 wt % was added thereto over about 10 minutes, and stirring was further continued for 3 hours. A reaction mixture (pH: 10.05, $Al_2O_3$ concentration: 1.98 wt %) was obtained.

2,300 g of this reaction mixture was charged in a porelain enameled stainless steel autoclave, and hydrothermal treatment was conducted at 140° C. for 12 hours. An aqueous suspension obtained showed pH of 8.38 and electric conductivity of 7,955 $\mu$S/cm, and had an $Al_2O_3$ concentration of 1.98 wt %. The aqueous suspension was taken out of the autoclave, 4,467 g of pure water and 10.5 g of acetic acid were added to the entire amount of the aqueous suspension, followed by stirring, and its pH was adjusted to 4.98. The resulting mixture was desalted and concentrated with a stirrer-equipped automatic continuous pressure filtration apparatus equipped with an ultrafiltration membrane (cut-off molecular weight: 50,000) to obtain 364 g of acidic aqueous alumina sol. The acidic aqueous alumina sol thus obtained had pH of 4.34, an $Al_2O_3$ concentration of 12.0 wt %, electric conductivity of 290 $\mu$S/cm, and a particle size by dynamic light scattering method of 264 nm, and the specific surface area by BET method of a powder dried at 300° C. showed 136 $m^2$/g. Colloidal particles of alumina hydrate contained in the acidic aqueous alumina sol obtained were formed secondary particles having an elongated shape of 50 to 300 nm formed by rectangular plate-like primary particles having a length of one side of 10 to 20 nm and having boehmite structure.

Gel obtained by drying this acidic aqueous alumina sol at 110° C. was roughly ground with an alumina mortar, and placed in an alumina crucible to calcine in an electric furnace at 1,000° C. for 5 hours. The powder obtained here had δ-form crystal structure as a result of measurement with X-ray diffraction device, and the specific surface area by BET method was 100 $m^2$/g. 750 g of this δ-form alumina powder was charged in 5 liter ball mill vessel together with 12.6 kg of zirconia beads having a diameter of 5 mm and 1,600 g of pure water, and ground for 96 hours, thereby to obtain an aqueous alumina slurry in which δ-form alumina powder having a primary particle size of 10 to 40 nm and a mean secondary particle size of 320 rim was dispersed. The δ-form alumina solid content in the aqueous alumina slurry was 25 wt %. According to the observation of δ-form alumina powder by a transmission electron microscope, 90% of all of the primary particles had a particle size of 20 to 30 nm. The minimum primary particle size was 10 nm and the maximum primary particle size was 40 nm. The particle size distribution of the primary particles is very sharp. The shape of the primary particles was granular.

380 g of aluminum nitrate nonahydrate was dissolved in 1 kg of pure water. This aqueous solution was boiled, and 1,320 g of 35% hydrogen peroxide aqueous solution and 110 g of aluminum metal powder were gradually added thereto to dissolve those and conduct reaction. The reaction solution was filtered to obtain an aqueous solution of basic aluminum nitrate (BANa). The aqueous solution. of basic aluminum nitrate (BANa) was one having an $Al_2O_3$ reduced concentration of 9.9 wt % and nitric acid ion concentration of 7.2 wt %, and a basicity of 80.0%, being represented by the chemical composition of $Al(OH)_{2.4}(NO_3)_{0.6}$.

Further, 60 wt % nitric acid was added to the aqueous solution of basic aluminum nitrate to prepare an aqueous solution of basic aluminum nitrate (BAN) having an $Al_2O_3$ reduced concentration of 7.1 wt % and a nitric acid ion concentration of 17.3 wt %, and a basicity of 33.3%, and being represented by the chemical composition of $Al(OH)(NO_3)_2$.

When the aqueous alumina slurry was diluted with pure water, the aqueous solution of basic aluminum nitrate (BAN) was added as a polishing accelerator to prepare a polishing composition having an alumina solid content of 6.7 wt %, and as basic aluminum nitrate represented by the chemical composition of $Al(OH)(NO_3)_2$ an $Al_2O_3$ reduced concentration of 0.62 wt % and a nitric acid concentration of 1.4 wt %.

Example 2

Gel obtained by drying the acidic aqueous alumina sol described in Example 1 at 110° C. was roughly ground with an alumina mortar, and placed in an alumina crucible to calcine in an electric furnace at 1,200° C. for 5 hours. The powder obtained here had α-form crystal structure as a result of measurement with X-ray diffraction device, and the specific surface area by BET method was 10.5 m²/g. 750 g of this α-form alumina powder was charged in 5 liter ball mill vessel together with 12.6 kg of zirconia beads having a diameter of 5 mm and 1,600 g of pure water, and ground for 96 hours, thereby to obtain an aqueous alumina slurry in which α-form alumina powder having a primary particle size of 70 to 120 nm and a mean secondary particle size of 340 nm was dispersed. The α-form alumina solid content in the aqueous alumina slurry was 25 wt %. According to the observation of α-form alumina powder by a transmission electron microscope, 85% of all of the primary particles had a particle size of 80 to 100 nm. The minimum primary particle size was 70 nm and the maximum primary particle size was 120 nm. The particle size distribution of the primary particles is very sharp. The shape of the primary particles was granular.

When the aqueous alumina slurry gas diluted with pure water, an aqueous solution of basic aluminum nitrate (BAN) was added as a polishing accelerator to prepare a polishing composition having an alumina solid content of 6.7 wt %, and as basic aluminum nitrate represented by the chemical composition of $Al(OH)(NO_3)_2$ an $Al_2O_3$ reduced concentration of 0.62 wt % and a nitric acid concentration of 1.4 wt %.

Example 3

750 g of commercially available α-form alumina powder (mean particle size: 1.1 μm) was charged in 5 liter ball mill vessel together with 12.6 kg of zirconia beads having a diameter of 5 mm and 1,500 g of pure water, and ground for 48 hours, thereby to obtain an aqueous alumina slurry containing α-form alumina having a primary particle size of 50 to 500 nm and a mean secondary particle size (mean aggregated particle size) of 350 nm, and the slurry containing 33 wt % of alumina as a solid content. This aqueous alumina slurry (α-form alumina solid content: 33 wt %) and the aqueous alumina slurry (δ-form alumina solid content:I25 wt %) obtained in Example 1 were mixed such that the weight ratio of the δ-form alumina solid content (a) to the α-form alumina solid content (b) was a:b=50:50 to obtain a Mixed aqueous alumina slurry (mean secondary particle size: 370 nm). When the mixed aqueous alumina slurry was diluted with pure water, an aqueous solution of basic aluminum nitrate (BAN) was added as a polishing accelerator to prepare a polishing composition having an α-form alumina solid content of 3.4 wt %, δ-form alumina solid content of 3.4 wt %, and as basic aluminum nitrate represented by the chemical composition of $Al(OH)(NO_3)_2$ an $Al_2O_3$ reduced concentration of 0.62 wt % and a nitric acid concentration of 1.4 wt %.

Example 4

The aqueous alumina slurry (α-form alumina solid content: 33 wt %) obtained in Example 3 and the aqueous alumina slurry (δ-form alumina solid content: 25 wt %) obtained in Example 1 were mixed such that the weight ratio of the δ-form alumina solid content (a) to the α-form alumina solid content (b) was a:b=10:90 to obtain a mixed aqueous alumina slurry (mean secondary particle size: 370 nm),. When the mixed aqueous alumina slurry was diluted with pure water, an aqueous solution of basic aluminum nitrate (BAN) was added as a polishing accelerator to prepare a polishing composition having an α-form alumina solid content of 6.0 wt %, δ-form alumina solid content of 0.67 wt %, and a basic. aluminum nitrate represented by the chemical composition of $Al(OH)(NO_3)_2$ an $Al_2O_3$ reduced concentration of 0.62 wt % and nitric acid concentration of 1.4 wt %.

Comparative Example 1

750 g of commercially available κ-form alumina powder (mean particle size: 1.5 μm) was charged in 5 liter ball mill vessel together with 12.6 kg of zirconia beads having a diameter of 1 mm and 1,200 g of pure water, and ground for 96 hours, thereby to obtain an aqueous alumina slurry in which κ-form alumina powder having a primary particle size of 10 to 400 nm and a mean secondary particle size of 220 nm was dispersed. The κ-form alumina solid content, in the aqueous alumina slurry was 43 wt %. When the aqueous alumina slurry was diluted with pure water, an aqueous solution of basic aluminum nitrate (BAN) was added as a polishing accelerator to prepare a polishing composition having an alumina solid content of 6.7 wt %, and as basic aluminum nitrate represented by the chemical composition of $Al(OH)(NO_3)_2$ an $Al_2O_3$ reduced concentration of 0.62 wt % and a nitric acid concentration of 1.4 wt %.

Comparative Example 2

750 g of commercially available α-form alumina powder (mean particle size: 1.1 μm) was charged in 5 liter ball mill vessel together with 12.6 kg of zirconia beads having a diameter of 5 mm and 1,500 g of pure water, and ground for 48 hours, thereby to obtain an aqueous alumina slurry in which α-form alumina powder having a primary particle size of 50 to 500 nm and a mean secondary particle'size of 350 nm was dispersed. The α-form alumina solid content in the aqueous alumina slurry was 33 wt %. When the aqueous alumina slurry was diluted with pure water, an aqueous solution of basic aluminum nitrate (BAN) was added as a polishing accelerator to prepare a polishing composition having an alumina solid content of 6.7 wt %, and as basic aluminum nitrate represented by the chemical composition of $Al(OH)(NO_3)_2$ an $Al_2O_3$ reduced concentration of 0.62 wt % and a nitric acid concentration of 1.4 wt %.

Comparative Example 3

The aqueous solution of basic aluminum nitrate (BAN) as a polishing accelerator was added to a slurry obtained by dispersing commercially available high purity δ-form alumina powder (primary particle size: 10 to 60 nm, mean secondary particle size: 800 nm) having a plate-like shape in pure water to prepare a polishing composition having an alumina solid content of 6.7 wt %, and as basic aluminum nitrate represented by the chemical composition of $Al(OH)(NO_3)_2$ an $Al_2O_3$ reduced concentration of 0.62 wt % and a; nitric acid concentration of 1.4 wt %.

Comparative Example 4

The aqueous solution of basic aluminum nitrate (BAN) as a polishing accelerator was added to a slurry obtained by dispersing commercially available high purity α-form alumina powder (primary particle size: 150 to 300 nm, mean secondary particle size: 280 nm) in pure water to prepare a polishing composition having an alumina solid content of 6.7 wt %, and as basic aluminum nitrate represented by the chemical composition of $Al(OH)(NO_3)_2$ an $Al_2O_3$ reduced concentration of 0.62 wt % and a nitric acid concentration of 1.4 wt %.

Reference Example 1

When the commercially available silica sol (SNOWTEX-ZL (trademark), manufactured by Nissan Chemical Industries, Ltd.; $SiO_2$ concentration: 40 wt %, primary particle; size: 70 to 100 nm, mean secondary particle size: 110 nm) was diluted with pure water, an aqueous solution of basic aluminum nitrate (BAN) was added as a polishing accelerator to prepare a polishing composition having a silica solid content of 6.7 wt %, and a basic aluminum nitrate represented by the chemical composition of $Al(OH)(NO_3)_2$ an $Al_2O_3$ reduced concentration of 0.62 wt % and a nitric acid concentration of 1.4 wt %.

Polishing Test

Polishing test was conducted as follows.

2.5 inch memory hard disk substrate obtained by non-electrolysis plating Ni—P on an aluminum substrate in a thickness of 10 μm was used as a material to be processed. This substrate was already subjected to primary polishing, and had a mean surface roughness of 1.8 nm.

A suede-type polyurethane-made polishing pad (POLITEX DG (trademark), diameter: 250 mm, manufactured by Rodel-Nitta Corp.) was adhered to a surface plate of an Oscar-type lens polishing machine. The polished surface of the substrate is faced with the polishing pad, and was polished by applying a load of 14 kPa.

The number of revolution of the surface plate was 30 revolutions per minute, and the amount of the slurry supplied was 2 ml/minute.

After polishing, the material to be processed was taken out and cleaned by repeating ultrasonic cleaning.

After cleaning, the aluminum disk was dried, and the removal rate was determined from weight loss. Surface defect was observed with a differential interference microscope, and degree of asperity, pit, scratch and the like were judged. The maximum and mean surface roughness were measured with a scanning whitelight interferometry or a phase-contrast measurement method using FDA, by using a commercially available instrument, such as an instrument called "New View 100" manufactured by Zygo Corp., U.S.A.

Physical properties of the Examples and Comparative Examples are shown in Table 1.

TABLE 1

| Polishing material | Crystal structure | Primary particle size (nm) | Mean secondary particle size (nm) |
|---|---|---|---|
| Example 1 | δ-form alumina | 10–40 | 320 |
| Example 2 | α-form alumina | 70–120 | 340 |
| Example 3 | δ-form alumina | 10–40 | 370 |
|  | α-form alumina | 50–500 |  |
| Example 4 | δ-form alumina | 10–40 | 370 |
|  | α-form alumina | 50–500 |  |

TABLE 1-continued

| Polishing material | Crystal structure | Primary particle size (nm) | Mean secondary particle size (nm) |
|---|---|---|---|
| Comparative Example 1 | κ-form alumina | 10–400 | 220 |
| Comparative Example 2 | α-form alumina | 50–500 | 350 |
| Comparative Example 3 | δ-form alumina | 10–60 | 800 |
| Comparative Example 4 | α-form alumina | 150–300 | 280 |
| Reference Example 1 | Amorphous silica | 70–100 | 110 |

Further, the removal rate, mean surface roughness and maximum surface roughness in the polishing test in the Examples and Comparative Examples are shown in Table 2.

TABLE 2

| Polishing material | Removal rate Vp (nm/min) | Mean surface roughness Ra (A) | Maximum surface roughness PV (A) |
|---|---|---|---|
| Example 1 | 109 | 3.4 | 45 |
| Example 2 | 155 | 4.2 | 54 |
| Example 3 | 204 | 4.7 | 67 |
| Example 4 | 238 | 5.2 | 69 |
| Comparative Example 1 | 113 | 5.2 | 65 |
| Comparative Example 2 | 160 | 5.7 | 71 |
| Comparative Example 3 | 121 | 6.0 | 114 |
| Comparative Example 4 | 60 | 4.5 | 58 |
| Reference Example 1 | 37 | 4.1 | 63 |

Note
A: angstrom

It is seen from Table 2 that when Example 1 and Comparative Example 1 are compared, the removal rate is almost equivalent, but regarding the surface roughness, Example 1 wherein the primary particle size is 10 to 40 nm, thus showing a sharp particle size distribution, shows good surface roughness, whereas Comparative Example 1 wherein the primary particle size is 10 to 400 nm, thus showing a broad distribution and the presence of coarse particles, shows poor surface roughness.

Further, when Example 2 and Comparative Example 2 are compared, it is seen that there is the same tendency.

Further, it is seen in Comparative Example 3 that since the particle shape is the plate-like δ-form alumina powder, the material to be polished is in the state that the material slides on the pad during polishing and the removal rate is-slow.

It is seen from Table 2 that in Examples 3 and 4 wherein an alumina powder mixture of δ-form alumina powder and an alumina powder obtained by subjecting commercially available α-form alumina to wet grinding treatment is used; as an abrasive, the removal rate is 1.3 to 1.5 times faster than that in Comparative Example 2 using only commercially available α-form alumina powder, and the surface roughness is improved.

It is seen that in Comparative Example 4, the primary particle size is 150 to 300 nm, thus showing a sharp particle size distribution, but since the primary particle size is 150 nm or more, the surface roughness is large.

Further, it is seen that when comparing a silica sol used in Reference Example 1 to Example: 1 and 2, known as an abrasive material which can provide high quality polished surface, the surface roughness is equivalent, but the removal rate is slow in ⅓ or less.

The present invention provides. the alumina powder characterized by having a single or multiple crystal structure selected from the group consisting of γ, δ and θ-forms, a sharp particle size distribution, a primary particle size of 10 to 50 nm, a mean secondary particle size (mean aggregated particle size) of 100 to 500 nm, and a granular primary particle shape, and the alumina powder characterized by having an α-form crystal structure, a sharp particle size distribution, a primary particle size of 60 to 150 nm, a mean secondary particle size (mean aggregated particle size) of 200 to 500 nm, and a granular primary particle shape. The present invention also provides polishing compositions for aluminum disks using those alumina powders as an abrasive.

Further, the present invention provides the polishing composition for aluminum disk, wherein an alumina powder mixture is used as an abrasive, the alumina powder mixture being prepared by adding and mixing the alumina powder having a single or multiple crystal structure selected from the group consisting of γ, δ and θ-forms, a primary particle size of 10 to 50 nm, a mean secondary particle size (mean aggregated particle size) of 100 to 500 nm, and a granular primary particle shape to the alumina powder having an α-form crystal structure, a primary particle size of 60 to 150 nm, a mean secondary particle size (mean aggregated particle size) of 200 to 500 nm, and a granular primary particle shape, or to the alumina powder having an α-form crystal structure, a primary particle size of 50 nm to 2μm, and a mean secondary particle size of .200 nm to 3 μm obtained by calcining and grinding the commercially available aluminum hydroxide produced by the Bayer process.

The primary particle size which acts on polishing properties has a sharp particle size distribution in the range of 20 to 100 nm, and the secondary particle size is 500 nm or less, so that the surface roughness is small, and high quality polished surface having less orange peel, scratch, pit and asperity is obtained. Further, from that the polishing composition has high speed polishing property as compared with silica sol by which the same degree of the high quality polished surface is obtained, it is possible to improve productivity of ultraprecision polishing step and to decrease the production cost.

Further, it is presumed that in the polishing composition for aluminum disk, using an alumina powder mixture as an abrasive, since the alumina powder having a single or multiple crystal structure selected from the group consisting of γ, δ and θ-forms, and a primary particle size of 10 to 50 nm, which is softer than the alumina powder having α-form crystal structure, is smaller than the alumina powder having α-form crystal structure, the alumina powder having a single or multiple crystal structure selected from the group consisting of γ, δ and θ-forms covers the surface of the alumina powder having α-form crystal structure, and enters gaps of the alumina powder having α-form crystal structure so as to obtain a closest packed structure therein during polishing. For this reason, a polishing composition for aluminum disk, providing good surface roughness and having high removal rate is obtained, and this makes it possible to improve productivity in precision polishing step and to decrease the production cost.

The polishing composition of the present invention is useful to polish the surface of a layer of non-electrolysis nickel-phosphorus (Ni—P) plating and the like, particularly the surface of a hard layer of non-electrolysis nickel-phosphorus (Ni—P) plating having a composition of 90 to 92% Ni and 8 to 10% P, formed on an aluminum disk which can be supplied as industrial products; the surface of aluminum oxide layer; or the surface of aluminum, its alloy or aluminate.

Further, the polishing material comprising an abrasive of alumina in accordance with the present invention can efficiently provide a smooth polished surface with high precision, and as a result, the polishing material can be used for polishing an oxide film, a nitride film or a carbide film of semiconductor devices, and wiring metals of semiconductor multilayer array substrate , and also for final finish polishing of magnetic head, quartz, glass or the like.

Further, the abrasive of alumina in accordance with the present invention can be used, other than use for polishing, as a material for catalyst, a raw material of alumina or a sintered product containing alumina, fillers for plastics, or the like.

What is claimed is:

1. A process for producing a granular: alumina powder having a single or multiple crystal structure selected from the group consisting of γ, δ and θ-forms, a primary particle size of 10 to 50 nm, and a mean secondary particle size of 100 to 500 nm, comprising:
   (A) a step of adding an alkali to an aqueous alumina sot containing fibrous colloidal particles of amorphous alumina hydrate to form a reaction mixture having pH of 9 to 12;
   (B) a step of subjecting the reaction product obtained in step (A) to hydrothermal treatment at 110 to 250° C. to form an aqueous suspension containing alumina hydrate having boehmite structure;
   (C) a step of drying the aqueous suspension obtained in step (B) at 100° C. or more and then calcining the same at 500 to 1,130° to form alumina having a single or multiple crystal structure selected from the group consisting of λ, δ and θ-forms; and
   (D) a step of dry and/or wet grinding the alumina obtained in step (C).

2. A polishing composition for an aluminum disk, comprising an alumina abrasive, water and a polishing accelerator, wherein said alumina is a granular alumina powder having a single or multiple crystal structure selected from the group consisting of γ, δ and θ-forms, a primary particle size of 10 to 50 nm, and a mean secondary particle size of 100 to 500 nm.

3. The polishing composition for an aluminum disk as claimed in claim 2, wherein the polishing accelerator is a basic salt formed from a trivalent or tetravalent metal and an inorganic or organic acid.

4. The polishing composition for an aluminum disk as claimed in claim 2, further comprising an alumina powder having α-form crystal structure, a primary particle size of 50 nm to 2 μm, and a mean secondary particle size of 200nm to 3 μm.

5. The polishing composition for an aluminum disk as claimed in claim 2, further comprising an alumina powder having α-form crystal structure, a primary particle size of 50 nm to 2 μm, and a mean secondary particle size of 200 nm to 3 μm, wherein the polishing accelerator is a basic salt formed from a trivalent or tetravalent metal and an inorganic or organic acid.

6. A process for producing a granular alumina powder having an α-form crystal structure, a primary particle size of 60 to 150 nm, and a mean secondary particle size of 200 to 500 nm, comprising:
   (A) a step of adding an alkali to an aqueous alumina sol containing fibrous colloidal particles of amorphous alumina hydrate to form a reaction mixture having pH of 9 to 12;

(B) a step of subjecting the reaction product obtained in step (A) to hydrothermal treatment at 110 to 250° C. to form an aqueous suspension containing an alumina hydrate having boehmite structure;

(C) a step of drying the aqueous suspension obtained in step (B) at 100° C. or more and then calcining the same at 1,150 to 1,300° C. to form alumina having an α-form crystal structure; and (D) a step of dry and/or wet grinding the alumina obtained in step (C).

7. A polishing composition for an aluminum disk, comprising an alumina abrasive, water and a polishing accelerator, wherein said alumina is a granular alumina powder having an α-form crystal structure, a primary particle size of 60 to 150 nm, and a mean secondary particle size of 200 to 500 nm.

8. The polishing composition for an aluminum disk as claimed in claim 7 wherein the polishing accelerator is a basic salt formed from a trivalent or tetravalent metal and an inorganic or organic acid.

* * * * *

UNITED STATES PATENT AND TRADEMARK OFFICE
CERTIFICATE OF CORRECTION

PATENT NO. : 6,440,187 B1
DATED : August 27, 2002
INVENTOR(S) : Toshio Kasai, Kiyomi Ema, Isao Ota and Tohru Nishimura It is certified that error appears in the above-identified patent and that said Letters Patent is hereby corrected as shown below:

Column 1,
Line 11, change "particle:shape" to -- particle shape --;
Line 12, change "crystal'structure" to -- crystal structure --;
Line 15, change "´shape'" to -- shape --; and
Line 26, change "nickel-phosphornus" to -- nickel-phoshorus --.

Column 4,
Line 64, change ":can" to -- can --.

Column 5,
Line 46, change ":and" to -- and --.

Column 6,
Line 65, change "metal:" to -- metal --.

Column 10,
Line 46, change "particle'size" to -- particle size --; and
Line 66, change "a;" to -- a --.

Column 11,
Line 46, change "interference:" to -- interference --.

Column 12,
Line 67, change "Example:" to -- Example --.

Column 13,
Line 31, change ".200nm" to -- 200nm --.

Column 14,
Line 19, change "granular:" to -- granular --;
Line 24, change "sot" to -- sol --; and
Line 34, change "º" to -- ºC --.

UNITED STATES PATENT AND TRADEMARK OFFICE
CERTIFICATE OF CORRECTION

PATENT NO. : 6,440,187 B1
DATED : August 27, 2002
INVENTOR(S) : Toshio Kasai, Kiyomi Ema, Isao Ota and Tohru Nishimura It is certified that error appears in the above-identified patent and that said Letters Patent is hereby corrected as shown below:

<u>Column 16,</u>
Line 8, change "claim 7" to -- claim 7, --.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,440,187 B1
DATED         : August 27, 2002
INVENTOR(S)   : Toshio Kasai et al.

It is certified that error appears in the above-identified patent and that said Letters Patent is hereby corrected as shown below:

<u>Column 1,</u>
Line 26, change "nickel-phoshorus" to -- nickel-phosphorus --.

Signed and Sealed this

Third Day of June, 2003

JAMES E. ROGAN
*Director of the United States Patent and Trademark Office*